Sept. 2, 1941.  E. J. LEWIS  2,254,227
GLASS TEMPERING METHOD AND APPARATUS
Filed April 22, 1937
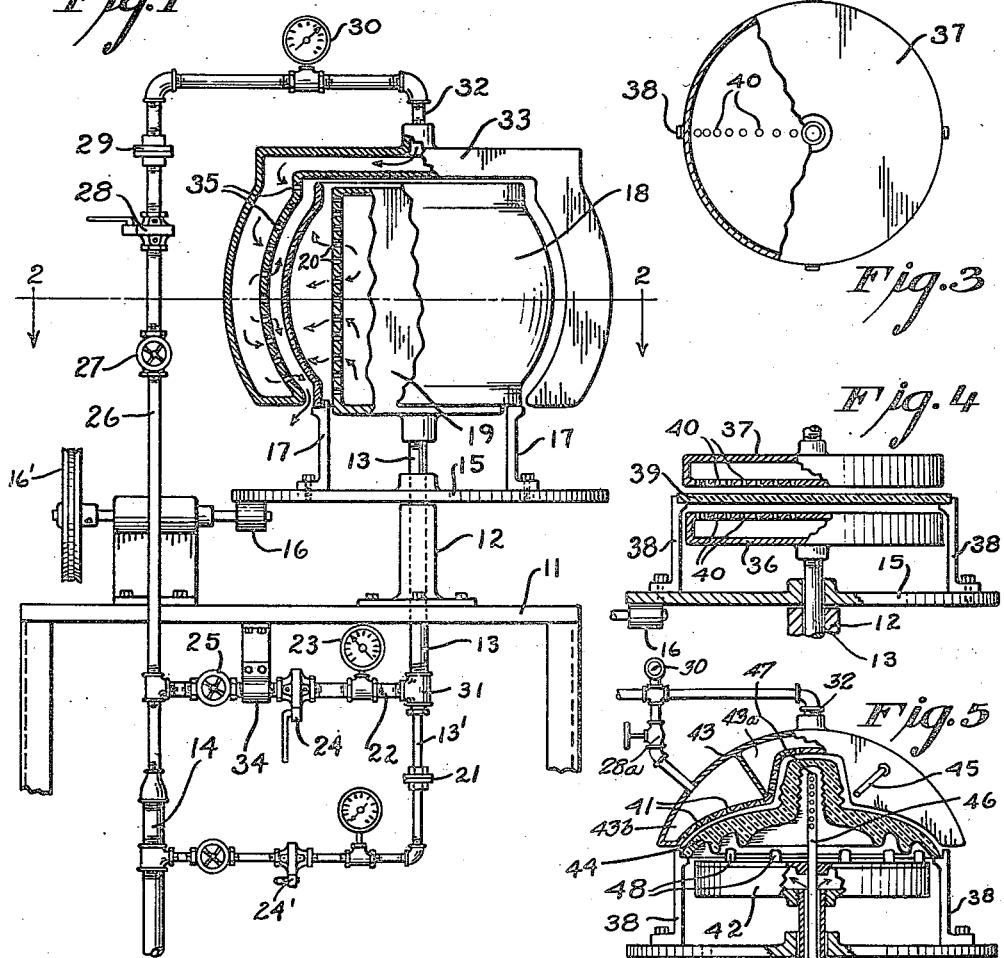
INVENTOR.
Evan J. Lewis
BY Dorsey, Cole & Garner
ATTORNEYS.

Patented Sept. 2, 1941

2,254,227

UNITED STATES PATENT OFFICE 2,254,227

GLASS TEMPERING METHOD AND APPARATUS

Evan Jarrett Lewis, Corning, N. Y., assignor to Corning Glass Works, Corning, N. Y., a corporation of New York Application April 22, 1937, Serial No. 138,418

7 Claims. (Cl. 49—45)

The present invention relates to methods of and apparatus for tempering glass articles. The prior art teaches tempering methods which involve heating the articles to near their softening point and then rapidly chilling them to below their strain point. Softening point as thus saved is an arbitrary viscosity condition of the glass, usually that at which a fibre of glass from .55 to .75 mm. in diameter will elongate under its own weight at the rate of 1 mm. per minute. Measured in poises, this viscosity condition has a value of $1.8 \times 10^7$. Strain point as used above is another more or less arbitrary viscosity condition of the glass such that below it the glass may be rapidly heated or cooled without the introduction of permanent stresses therein. Measured in poises, this viscosity condition has a value of $4.0 \times 10^{14}$.

In one heretofore suggested method of tempering such articles, the surfaces to be hardened are subjected to jets of air supplied from blowing members secured to rotatable shafts arranged at right angles to the surfaces of the article. Each of these blowing members is arranged parallel to a surface of the glass and has a row of equally spaced orifices radiating from the axis of rotation so that cooling jets of air issuing from such orifices will describe closely spaced concentric circumferences about the opposite surfaces of the article. With such an arrangement, however, the amount of cooling medium directed against the article per unit of area and of time is progressively less as the distance from the center of the surface becomes greater, thereby resulting in a much reduced state of compression of the outer area of the article surfaces.

The present invention not only teaches a satisfactory method of tempering flat and differently shaped articles of uniform wall thicknesses in which a uniform temper distribution is desired, but also takes into consideration variation in cooling rates which may be necessary to obtain the desired state of compression, or temper distribution when the wall thickness of the article varies. The present invention also contemplates the tempering of glass articles, in which it is desirable to selectively temper certain portions thereof differently than others. The tempering of such articles obviously presents difficulties not encountered in the tempering of flat ware.

An object of the present invention is the tempering of glass articles in such a manner that the extent or variation of temper in the various parts of an article, irrespective of its shape or varied thickness characteristics, may be readily controlled.

The present invention embodies among its features a rotary support for the article to be tempered and a plurality of air chambers each having apertures so arranged that streams of a cooling medium, such as air or steam, issuing therefrom impinge on opposite surfaces of a wall of the article.

A feature of the invention as regards the tempering of flat surfaces of an article is the provision of chambers on opposite sides of such flat surfaces and each chamber having a series of apertures therethrough arranged in a single row from its center to a point near its periphery, with the spacing between adjacent apertures being gradually reduced proportionally with their distance from center so that same amount of a cooling medium may be directed against the article per unit of area and time as the article is rotated.

A feature of the invention as regards the tempering of bottles, lantern globes, the pin hole areas of insulators, and inner wall surfaces of similarly shaped articles, is the provision of a chamber arranged adjacent the inner wall of the article and, when practicable, following the general contour thereof and having a single row of apertures through which streams of a cooling medium are directed against a very narrow rectangular area of the wall surface and which streams move in a direction at right angles to the axis of rotation of the article. Thus the relatively small quantity of cooling medium which becomes heated by contact with the interior surface of the article has such a comparatively large area in the space between the imperforate surface of the chamber and the article wall that the movement of the heated medium out of the article is substantially unimpeded.

In the drawing:

Fig. 1 is an elevational view partly in section of one form of apparatus embodying the invention as used in tempering lantern globes;

Fig. 2 is a sectional view taken on line 2—2 of Fig. 1;

Figs. 3 and 4 are plan and elevational views, partly in section, of an embodiment of the invention suitable for use in tempering circular glass discs;

Fig. 5 is a side elevation, partly in section, illustrating an embodiment of the invention as used in tempering high voltage insulators; and Fig. 6 is a plan view of the lower air chamber of the apparatus illustrated in Fig. 5.

Referring particularly to Figs. 1 and 2 of the drawing, a support comprising a table 11 has a flanged sleeve 12 mounted thereon over a suitable aperature through the table top. Vertically disposed and concentrically arranged branch pipe lines 13 and 13' of a main air supply pipe line 14 pass upward through the sleeve 12. The pipe 13 serves as an axle for a turntable 15 which rests on a friction drive roller 16 adapted to be driven by a pulley 16'. The top surface of the turntable 15 is provided with suitably spaced brass fingers 17 for supporting the article to be tempered. The upper end of the pipe 13 is threaded into the lower end of an air chamber 19 having but a single line of perforations 20 through one wall thereof directed toward the inner wall of the article to be tempered, in the illustration a lantern globe 18. The lower end of the pipe 13 is connected with the main air supply line 14 by an intermediate line 22 including a pressure gauge 23, a quick shut-off valve 24, and a pressure regulating valve 25, while the pipe 13' is connected to line 14 over a similar path.

Extending from the main air supply line 14 is a third branch line 26 which includes a pressure regulating valve 27, a quick shut-off valve 28, a union 29 and a pressure gauge 30. The branch line 26 terminates in a nipple 32 the lower end of which is threaded into an air chamber 33. The union 29 is provided to enable the rotation of the horizontal run of line 26 so as to bring chamber 33 clear of chamber 19 to enable the article 18 to be placed on and removed from the fingers 17. The entire piping system is held to the table 11 by a suitable pipe hanger 34 extending between the line 22 and the underside of table 11.

The inner wall of the chamber 33 follows the general outside contour of the article 18 to be tempered, and has a vertical row of perforations 35 through at least one inner wall thereof directed toward the adjacent outside wall of the lantern globe 18. As will be brought out more fully hereinafter, air supplied to the chambers 19 and 33 is emitted from apertures 20 and 35 against opposite sides of a wall of the lantern globe to be tempered. The size and spacing of these perforations for tempering different articles will, of course, vary to compensate for variations in wall thickness of an article, it being understood that the volume of cooling air required per unit of surface is usually greater on the thinner portions than on the thicker. In the case of the lantern globe 18, an even wall thickness is assumed to exist so that a substantially even close spacing of the perforations 20 and 35 will provide a treatment such that an even temper distribution will be obtained.

In tempering the lantern globe 18, shut-off valve 24' is closed as line 13' is not made use of in this specific application of the invention. Pressure regulating valves 25 and 27, however, are adjusted as required to insure the maintenance of a selected pressure of the cooling air in the chambers 19 and 33 determined as being that most satisfactory. The pressure and capacity of chambers 19 and 33 should be such, however, that no pressure drop occurs at the chamber apertures so that a constant equalized flow of the cooling air will impinge against each of the opposite surfaces of the article. The pressure maintained in the respective chambers, however, may differ when certain articles are being tempered. A 10 to 30 pound air pressure and speeds of rotation of the article between 125 and 250 revolutions per minute have been found to give satisfactory results. In tempering cylindrical articles, such as the lantern globe 18 as well as in tempering bottles and jars, it is important however that the space between the inner air supply chamber and the most restricted portion of the inner wall of the article be great enough to allow the free movement therefrom of the expended air so as to prevent its hindrance of the cooling action of the inner surface by the oncoming air. It is also important that the introduction of the cooling air into the chambers 19 and 33 be delayed until rotation of the articles has been started, as otherwise uneven chilling may result. This danger is obviated by starting the rotation of the article and then opening the quick shut-off valves 24 and 28 to allow the cooling air to fill up the chambers. By this sequence of procedure the cooling medium will initially impinge against the article at very low pressure and will gradually reach its maximum effectiveness as the selected pressures build up in the respective chambers. Cessation of the treat without disturbing the setting of pressure regulation valves 25 and 27, may be brought about by further manipulation of the quick shut-off valves 24 and 28 after any selected time period of treatment. Thereafter the rotation of the turntable may be stopped, the chamber swung clear of the article and the article removed.

If the article 18, instead of being in the form of a lantern globe, were closed at one end, the surfaces of the chambers 19 and 33 adjacent the closed end of the article would be provided with a system of perforations arranged as required to obtain the desired temper distribution in the flat or spherical portion of the article. Such an arrangement of perforations is illustrated in the embodiment of the invention illustrated in Figs. 3 and 4.

In Fig. 4 are illustrated air chambers 36 and 37 which may be substituted for air chambers 19 and 33 and fingers 38 which may be substituted for fingers 17 when flat articles of uniform thickness, such as discs 39, are to be tempered. It may be well to mention, however, that before chamber 36 can be substituted for chamber 19, that the vertical portion of branch line 13' extending above the union 21 and passing through the vertical lines (see Fig. 5) must be removed and a suitable plug inserted in the bottom opening of T 31. To obtain an even temper distribution in a flat or similarly shaped article, the space between the apertures 40 of each chamber are progressively decreased from a point near the axis of rotation of the article so that the same amount of cooling air is directed against the article per unit of area and of time. The sequence of operations is tempering flat and cylindrical articles requiring an even temperature distribution are the same.

When ware of a complicated configuration, such as the insulator 44 (Fig. 5), is to be tempered, suitable air chambers 42 and 43, designed to replace chambers 19 and 13, are provided. The chamber 43, it will be observed, is divided into two compartments 43a and 43b respectively, the compartment 43b being supplied with air via an auxiliary control valve 28a. This construction enables the independent control of the supply of air to those orifices 41 which direct air toward the upper skirt surfaces, for a purpose which will hereinafter be made clear. In tempering an insulator it is desirable that the head or load carrying portion be more highly tempered than the skirt portion. Such a temper distribution is in part produced by shaping the bottom wall of the chamber 43 to conform to the contour of the top side of the insulator and appropriately spacing a row of apertures 41 there-through directed toward the insulator. Since the major portion of the head of the insulator is substantially equidistant from the axis of rotation, the spacing of the apertures 41 adjacent the insulator head may be made substantially equal and of a size to effect very rapid chilling of the insulator head, while the spacing of those apertures adjacent the skirt portion of the insulator may be of a smaller size and spaced in the manner illustrated in Fig. 3 so as to temper this portion of the insulator to a lesser state of compression and to obtain an equal degree of temper distribution over the entire skirt area. The junction of the head and skirt portions of the insulator is the area of maximum strain and, accordingly, a tube 45 has been illustrated for directing an auxiliary stream of cooling air at the junction so that maximum tempering of this area will be effected. To enable the independent regulation of air supply to the surface area of pin hole 47, such area is chilled by cooling air supplied by an apertured tube 46 comprising a continuation of the branch air supply line 13'. The size of the tube 46 is only limited as much as is considered necessary to allow ample space for movement of the waste air so that such air interferes to a minimum degree with the oncoming air. A suitable distribution of temper on the under side of the skirt may be obtained by directing cooling air into the lower grooves of the insulator 44 by multi-apertured nipples 48 carried by chamber 42.

By providing suitable control equipment, the valves in the respective branch air supply lines may be automatically operated after selected time periods of the chilling treatment have elapsed to wholly or only in part discontinue the chilling treatment in accordance with the degree or distribution of temper desired.

If desired those orifices, 41, directed toward the insulator skirt, may be closed and those directed toward the head made of such size that relatively mild chilling of the adjacent upper skirt surface will result during a vigorous chilling of the outer surface of the head. With the apparatus modified as above outlined, a satisfactory distribution of compression may be obtained by fully opening valves 24, 24' and 27 to cause vigorous chilling of the head and lower skirt surfaces, for a time long enough to reduce the temperature of the glass below its strain point to a depth of one-sixteenth to one-eighth of an inch and to then discontinue or substantially reduce the flow of air to the lower skirt surfaces while continuing the blast of air against the head surfaces and the mild chilling of the upper surfaces of the skirt until a permanent set therein is produced, i. e., until all of the glass is at a temperature below its strain point. During this time the residual heat still present in the skirt portion of the insulator will be conducted to the vigorously chilled under surfaces thereof and anneal them to the lower degree of compression or temper desired.

As an alternative to closing those orifices 41 directed toward the upper surfaces of the skirt, all surfaces of the insulator may be vigorously chilled to a desired depth and the valves 28ª and 24 then actuated to discontinue or substantially reduce the flow of air to both the upper and lower skirt surfaces while continuing the blast against the head surfaces until the temperature throughout the heated article is below the strain point.

What is claimed is:

1. A method of treating a glass insulator, having head and skirt portions so that the head portion is tempered to a greater degree than the skirt, which includes heating the insulator to a predetermined temperature, rapidly chilling the surfaces of the skirt for a short time only so that sufficient heat remains under the skirt surfaces after the chilling treatment has been discontinued to partially anneal them and of, during such skirt chilling and annealing period, rapidly chilling the entire head portion of the insulator to a stable temperature.

2. A method of tempering a glass insulator having head and skirt portions, which includes heating the insulator a predetermined temperature, subjecting the interior and exterior surfaces of the head to high velocity air streams until the temperature of such portion has been reduced to a stable value, and of subjecting the interior and exterior surfaces of the skirt with high velocity air streams for such period only that the remaining internal heat therein becomes effective to partially anneal the surfaces of such skirt after the chilling action thereof has been discontinued.

3. A method of tempering a glass insulator having head and skirt portions, which includes heating the insulator to a predetermined temperature, vigorously chilling the head and part of the skirt surfaces while mildly chilling the remaining skirt surfaces and of discontinuing the vigorous chilling of the skirt surfaces before temperature stability thereof has been reached.

4. In an apparatus for tempering the flat surfaces of a circular glass article, a rotating support for the article, air chambers so positioned that the article when on the support is disposed between the chambers, each chamber having a row of apertures disposed radially with respect to the axis of rotation of the support and arranged to direct jets of air toward the apertures of the other, the spacing between the apertures in each chamber being progressively decreased as their distance from the axis of rotation of the support is increased.

5. In an apparatus for treating the surfaces of a glass insulator having a head and a skirt to increase its strength, a rotatable support for the insulator, separately valved means for selectively directing a chilling medium against the exterior and interior surfaces of the insulator head and against one of the surfaces of said skirt respectively, and means for rotating the support to assist in the distribution of the cooling medium against the surfaces to which it is directed.

6. A method of treating a glass article to produce varying degrees of temper therein which includes heating the article to a predetermined temperature, rapidly chilling predetermined surfaces of the article for a short time only so that sufficient heat remains therein after the chilling treatment of such surfaces has been discontinued to partially anneal them, and rapidly chilling the remaining surfaces of the article until it has reached a stable temperature.

7. The method of tempering a hollow glass body which comprises heating the body to a predetermined temperature and vigorously chilling different portions of said body by the application of streams of cooling fluid, and discontinuing the chilling of one of said portions while sufficient heat remains therein to partially anneal the surfaces thereof while continuing to chill another portion until a stable temperature is reached.

EVAN JARRETT LEWIS.